United States Patent [19]

Yates

[11] Patent Number: 4,618,792
[45] Date of Patent: Oct. 21, 1986

[54] DYNAMOELECTRIC MACHINE WITH A LAMINATED POLE PERMANENT MAGNET ROTOR

[75] Inventor: William W. Yates, Lima, Ohio
[73] Assignee: Westinghouse Electric Corp., Pittsburgh, Pa.
[21] Appl. No.: 654,627
[22] Filed: Sep. 26, 1984
[51] Int. Cl.[4] .............................. H02K 21/12
[52] U.S. Cl. .................... 310/156; 310/217; 310/218; 310/261
[58] Field of Search .............. 310/156, 216, 217, 218, 310/261, 262, 264, 265; 324/146

[56] References Cited

U.S. PATENT DOCUMENTS

| | | | |
|---|---|---|---|
| 3,012,161 | 12/1961 | Puder | 310/261 |
| 3,492,520 | 1/1970 | Yates | 310/156 |
| 4,234,808 | 11/1980 | Geppert | 310/156 |
| 4,354,126 | 10/1982 | Yates | 310/156 |
| 4,406,958 | 9/1983 | Palermo | 310/156 |
| 4,469,970 | 9/1984 | Neumann | 310/156 |
| 4,472,651 | 9/1984 | Jones | 310/156 |

Primary Examiner—R. Skudy
Attorney, Agent, or Firm—R. P. Lenart

[57] ABSTRACT

A dynamoelectric machine is provided with a stator assembly and a rotor mounted for rotation within the stator assembly. The rotor comprises a laminated core having a central portion which includes a plurality of non-magnetic structural laminations and a plurality of magnetic laminations interspersed among the non-magnetic laminations. The rotor also has two end portions, each of which includes a plurality of non-magnetic structural laminations positioned adjacent to each other and an end lamination which closes the structure. A plurality of permanent magnets and a plurality of magnetic pole pieces extend longitudinally within the core. Each of the pole pieces lies adjacent to one surface of each of the permanent magnets and extends circumferentially between the associated magnet surface and an edge of adjacent one of the magnetic laminations. This produces a plurality of magnetic flux paths circumferentially disposed about the periphery of the core. The cross-sectional area of the magnetic pole pieces is substantially constant within the central core portion and decreases as the pole pieces extend into the end portions of the rotor stack.

8 Claims, 7 Drawing Figures

DYNAMOELECTRIC MACHINE WITH A LAMINATED POLE PERMANENT MAGNET ROTOR

BACKGROUND OF THE INVENTION

This invention relates to dynamoelectric machines and more particularly to such machines which include permanent magnets assembled in a laminated pole rotor.

Available permanent magnets, such as rare earth magnets, have made it attractive to construct dynamoelectric machine rotors with permanent magnets rather than with wound coils for providing field excitation. Key advantages of the permanent magnet rotors such as reduction in weight and size, are particularly important in applications such as aircraft.

U.S. Pat. No. 4,354,126, which is hereby incorporated by reference, describes a dynamoelectric machine having a permanent magnet rotor which offers high strength construction, a laminated ferrous pole structure to obtain low eddy current losses, circumferential orientation of the rotor magnets, complete containment of the magnets, and an economically manufacturable structure. Such a rotor is especially suited to the high energy product characteristics of rare earth magnets. The magnetic structure of that rotor essentially comprises high strength, non-magnetic structural laminations having slots for the permanent magnets, alternating with magnetic laminations which have sufficient structure to conduct the magnetic flux to the machine air gap. The rotor ends are closed with non-magnetic laminations to close the magnet slots and wedges are used to contain the permanent magnets.

Although the rotor structure disclosed in U.S. Pat. No. 4,354,126 has proven to exhibit high strength characteristics at a peripheral speed of 471 feet per second, higher speed designs are still desirable. For a given speed, rotors having many poles, such as 12 pole rotors, will generate a frequency three times greater than a 4 pole design when operated as a generator. For extreme speeds, the high frequency of the many pole design is undesirable. In addition, when operating as a motor, a driving frequency for a 12 pole machine is three times that of a four pole machine. This imposes extremely fast switching speed requirements on an inverter drive. It is therefore desirable to use machines with a smaller number of poles for extremely high speed applications.

When one attempts to extend the design of the rotor disclosed in U.S. Pat. No. 4,354,126 to a rotor having a small number of poles, it becomes apparent that the ratio of the radial depth to the circumferential length available for the permanent magnets is much smaller. Therefore, the magnetic flux cannot be concentrated as well at the air gap. Furthermore, the circumferential length available to the magnet is much more than is needed. This invention overcomes these difficulties by providing a high speed laminated permanent magnet rotor which is suitable for a low pole number design.

SUMMARY OF THE INVENTION

A dynamoelectric machine constructed in accordance with one embodiment of this invention comprises:

a stator assembly;

a rotor mounted for rotation within the stator assembly; said rotor comprising a laminated core having a central portion including a plurality of non-magnetic structural laminations and a plurality of magnetic laminations interspersed among the non-magnetic structural laminations, and having two end portions each having a plurality of non-magnetic structural laminations positioned adjacent to each other;

a plurality of permanent magnets extending longitudinally within the core, each of the permanent magnets having a magnetization axis oriented in a substantially circumferential direction;

a plurality of magnetic pole pieces extending longitudinally within the core, each lying adjacent to one of the pole faces of each of the permanent magnets and extending circumferentially from the associated pole face to an edge of adjacent ones of the magnetic laminations to produce a plurality of magnetic flux paths which are circumferentially disposed about the periphery of the core, wherein the cross-sectional area of each of the pole pieces in a plane perpendicular to the rotational axis, is substantially constant within the central portion of the core and decreases as the pole pieces extend from the central core portion into the end portions of the core; and means for securing the laminations into a unit.

DESCRIPTION OF THE PREFERRED EMBODIMENT

Figure 1:
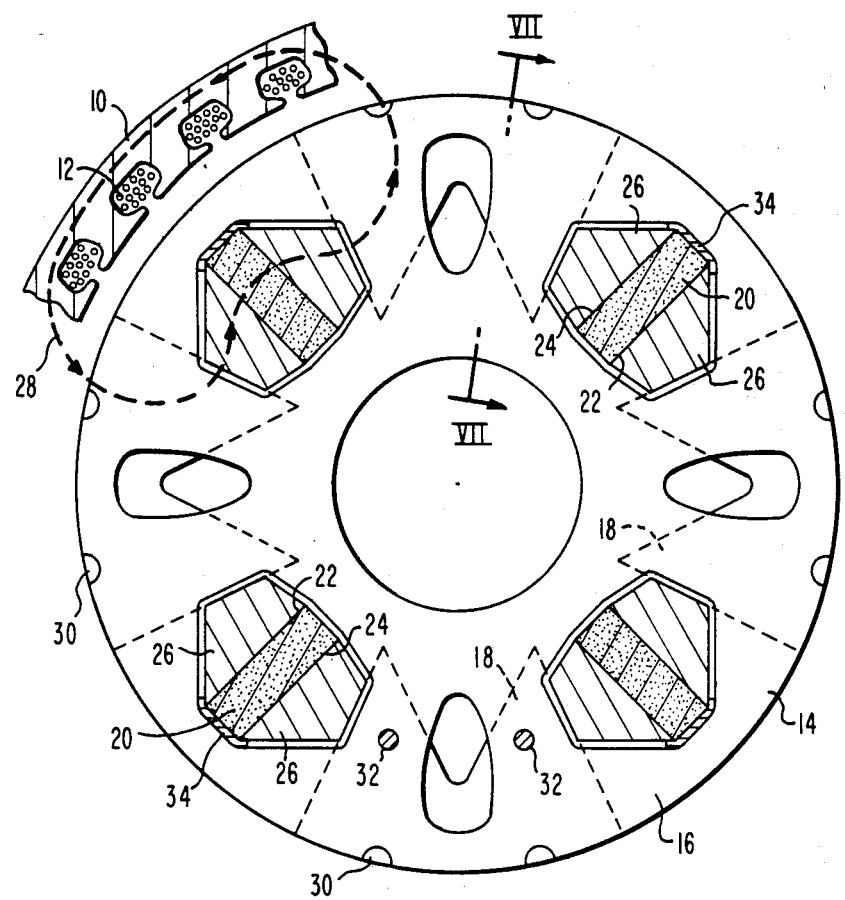
FIG. 1 is a partial cross-sectional view of a dynamoelectric machine constructed in accordance with one embodiment of the present invention.
Figure 7:
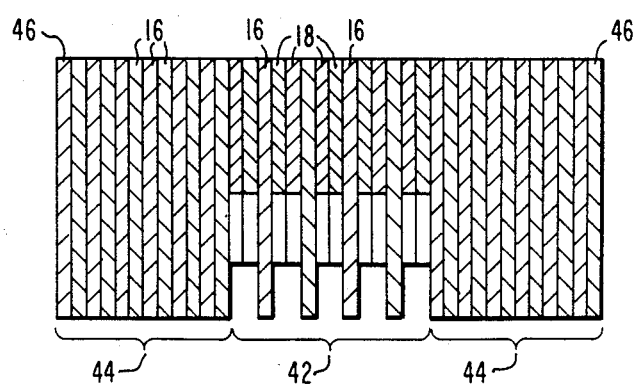
FIG. 7 is a partial cross-sectional view of the rotor lamination stack of FIG. 1 taken along line VII—VII.

Referring to the drawings, FIG. 1 is a partial cross-sectional view in a plane perpendicular to the rotational axis of a dynamoelectric machine constructed in accordance with one embodiment of the present invention. This machine includes a stator structure 10 and a stator coil 12 constructed in accordance with known technology. A laminated pole permanent magnetic rotor 14 is mounted for rotation within the stator assembly in a conventional manner. The rotor comprises a laminated core having a central portion which includes a plurality of non-magnetic structural laminations 16 and a plurality of magnetic laminations 18 interspersed among the non-magnetic structural laminations. As illustrated in FIG. 7, the rotor also includes two end portions each having a plurality of non-magnetic structural laminations positioned adjacent to each other and a non-magnetic end lamination with no apertures to close the structure. A plurality of permanent magnets 20 extend longitudinally within the core. Each of the permanent magnets includes major surfaces in the form of pole faces 22 and 24 which are oriented to be substantially perpendicular to the circumferential direction. A plurality of magnetic pole pieces 26 also extend longitudinally within the core. Each of the magnetic pole pieces lies adjacent to one of the major surfaces of one of the permanent magnets and extends circumferentially from the associated major surface to an edge of an adjacent one of the magnetic laminations 18. This produces a plurality of magnetic flux paths 28 which are circumferentially disposed about the periphery of the rotor core.

Means for securing the rotor laminations into a unit are provided in the form of a plurality of weld beads 30 which extend along the periphery of the rotor stack. Alternatively, the rotor stack may be secured by a plurality of rivets as illustrated by rivets 32 in FIG. 1. With the lamination sequence illustrated in FIG. 7, gaps are formed over the permanent magnets in the central, or active magnetic stack. Therefore, a thin sheet of non-magnetic material 34 is provided adjacent to the radially outermost surface of the magnets to contain magnetic fragments should the magnet shatter.

Figure 2:
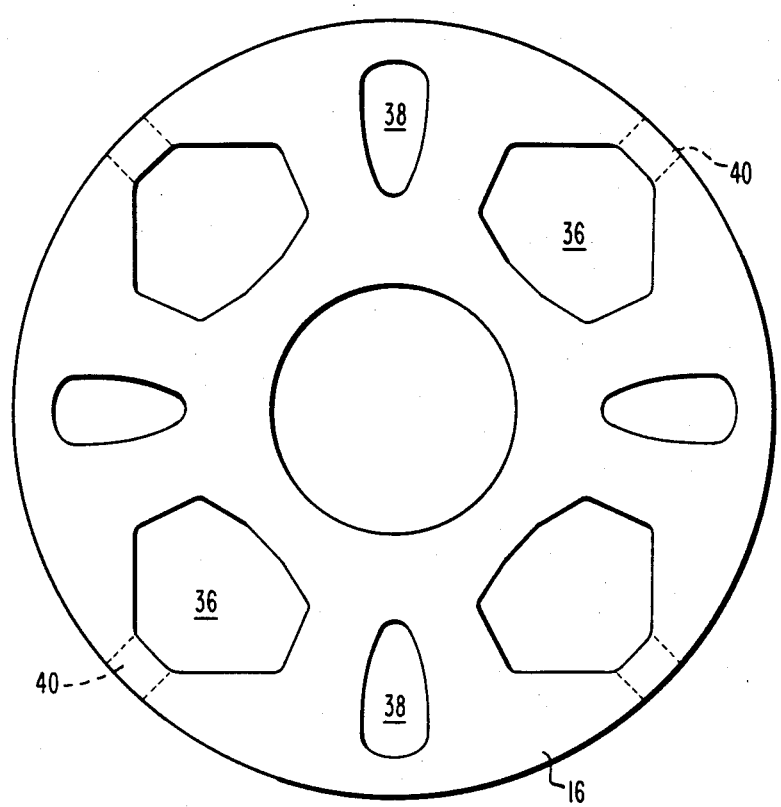
FIG. 2 is a plan view of one embodiment of a non-magnetic structural lamination for use in the rotor of the present invention.

FIG. 2 is a plan view of a non-magnetic lamination for use in the rotor illustrated in FIG. 1. This magnetic lamination has a circular shape and includes a plurality of apertures 36 for receiving the permanent magnets and magnetic pole pieces and a second plurality of apertures 38 which serve to reduce the weight of the rotor structure. A portion of each non-magnetic lamination 40 extends across the outermost portion of each magnet aperture to provide for radial retention of the magnets.

Figure 3:
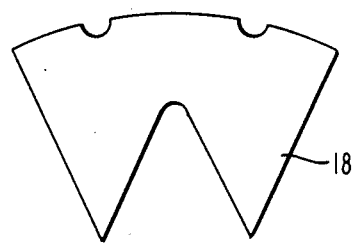
FIG. 3 is a plan view of one embodiment of a magnetic lamination for use in a rotor of the present invention.

FIG. 3 is a plan view of one of the magnetic material laminations which are interspersed between the non-magnetic structural laminations in the active rotor stack.

Figure 4:
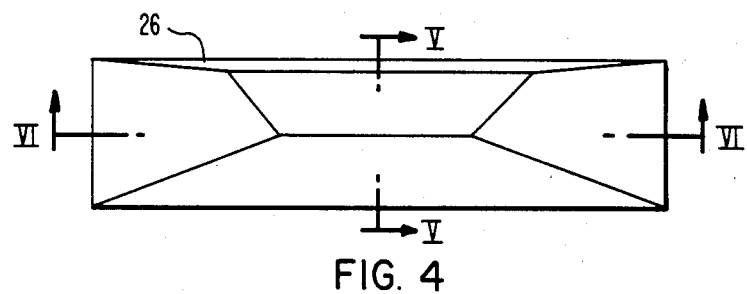
FIGS. 4, 5 and 6 illustrate a magnetic pole piece for use in the rotor of the present invention.

FIG. 4 is a plan view of one of the magnetic pole pieces 26 of the rotor of FIG. 1.

Figure 5:
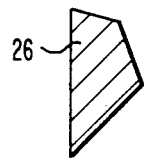

FIG. 5 is a cross-sectional view of the pole piece of FIG. 4 taken in a plane perpendicular to the rotor axis along line V—V. In this view, the pole piece is seen to have a trapeziform cross section in a plane that is perpendicular to the axis of the rotor illustrated in FIG. 1.

Figure 6:
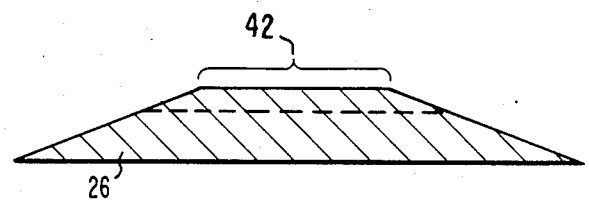

FIG. 6 is a cross-sectional view of the pole piece of FIG. 4 taken along line VI—VI. In this view, the pole piece is seen to have a trapezoidal cross section in a plane that is perpendicular to the adjacent magnet pole face and parallel to the rotational axis of the rotor. The cross-sectional area of the pole piece in the central core portion 42 is constant and the portions of the magnetic pole piece which extend outside of the magnetic stack region have a decreasing cross-sectional area and are tapered. The flux from these magnetic protrusions is brought back into the active stack by the tapered portion of the pole pieces. Thus the magnetic flux is concentrated to a practical air gap density level and a closer to ideal magnet area-to-length ratio is obtained. As shown in FIG. 1, for the active region of the rotor, the magnetic pole pieces extend from one of the pole faces of an associated permanent magnet to one edge of adjacent ones of the magnetic laminations.

FIG. 7 shows a partial cross-sectional view of the rotor of FIG. 1 in a radial plane as taken along line VII—VII. In this Figure, the alternating of magnetic and structural laminations is shown as two magnetic laminations to one structural lamination in the central, active portion 42 of the rotor core. The number and thickness of these laminations can be varied depending upon design requirements. Alternating of the laminations ceases in the two rotor end portions 44 at the ends of the active magnetic stack. In these end portions, continuous structural laminations 16 are used. End punchings 46, having no apertures but being made of the same material as the other non-magnetic structural laminations, are affixed to contain any particles which may result from a chipped magnet.

The high strength non-magnetic structural laminations of FIG. 2 may be constructed of Inconel, stainless steel or any other non-magnetic material with sufficient structural strength. The magnetic laminations of FIG. 3 may be made of any suitable magnetic material such as silicon steel or 50% nickel steel. The magnetic pole piece of FIGS. 4, 5 and 6 may be constructed of soft iron. The actual taper of the magnetic pole pieces 26 from the magnet pole face to the magnetic laminations can be adjusted to optimize the machanical construction of the non-magnetic structural laminations. The taper of the pole pieces in the axial direction can be adjusted to provide a substantially linear flux distribution in the end portions of the rotor. An assembled rotor stack as shown in FIG. 7 would be attached to an arbor in a conventional manner for mounting within the stator structure.

Although the present invention has been described in terms of what is at present believed to be its preferred embodiment, it will be apparent to those skilled in the art that various changes may be made without departing from the scope of the invention. It is therefore intended that the appended claims cover all such changes.

What is claimed is:

1. A dynamoelectric machine comprising:
  a stator assembly;
  a rotor mounted for rotation within said stator assembly;
  said rotor comprising a laminated core having a central portion including a plurality of non-magnetic structural laminations and a plurality of magnetic laminations interspersed among said non-magnetic structural laminations, and said core having two end portions each having a plurality of said non-magnetic structural laminations positioned adjacent to each other;
  a plurality of permanent magnets extending longitudinally within said core, each of said permanent magnets having pole faces oriented in planes which are substantially perpendicular to the circumferential direction;
  a plurality of magnetic pole pieces extending longitudinally within said core, each of said magnetic pole pieces lying adjacent to one of said pole faces of each of said permanent magnets and extending circumferentially from the associated major surface to an edge of adjacent ones of said magnetic laminations to produce a plurality of magnetic flux paths circumferentially disposed about the periphery of said core, wherein the cross-sectional area of each of said pole pieces in a plane perpendicular to the rotor axis is substantially constant within the central portion of said core and decreases as said pole pieces extend from said central portion into the end portions of said core; and
  means for securing said laminations into a unit.

2. A dynamoelectric machine as recited in claim 1, wherein said pole pieces having a trapeziform cross section in said plane which is perpendicular to the rotor axis and a trapezodial cross section in a plane substantially perpendicular to an adjacent one of said magnet pole faces.

3. A dynamoelectric machine as recited in claim 1, further comprising:
  a plurality of non-magnetic strips, each extending longitudinally within said core and each positioned adjacent to a radially outer surface of one of said permanent magnets.

4. A dynamoelectric machine as recited in claim 1, wherein:

said non-magnetic structural laminations are circular elements having openings for accommodating said permanent magnets and said magnetic pole pieces.

5. A dynamoelectric machine as recited in claim 1, wherein said means for securing said laminations includes;

a plurality of bead welds extending longitudinally over the surface of said core.

6. A dynamoelectric machine as recited in claim 1, wherein said means for securing said laminations includes:

a plurality of rivets extending longitudinally through said core.

7. A dynamoelectric machine as recited in claim 1, further comprising:

a non-magnetic end lamination attached to each end of said rotor core.

8. A dynamoelectric machine as recited in claim 1, wherein said magnetic pole pieces are shaped to provide a substantially linear flux distribution in end portions of said magnetic pole pieces.

* * * * *